Patented May 1, 1951

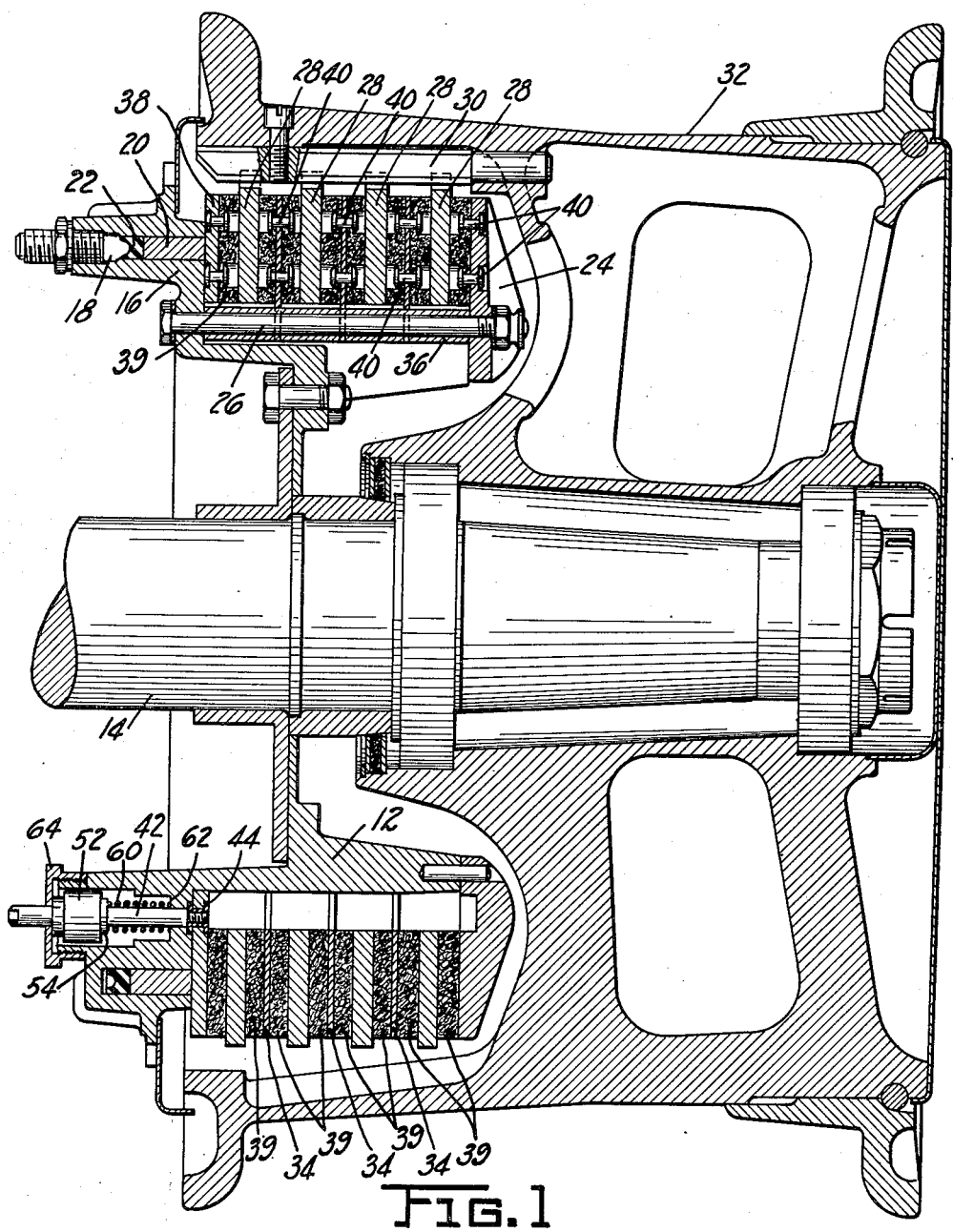

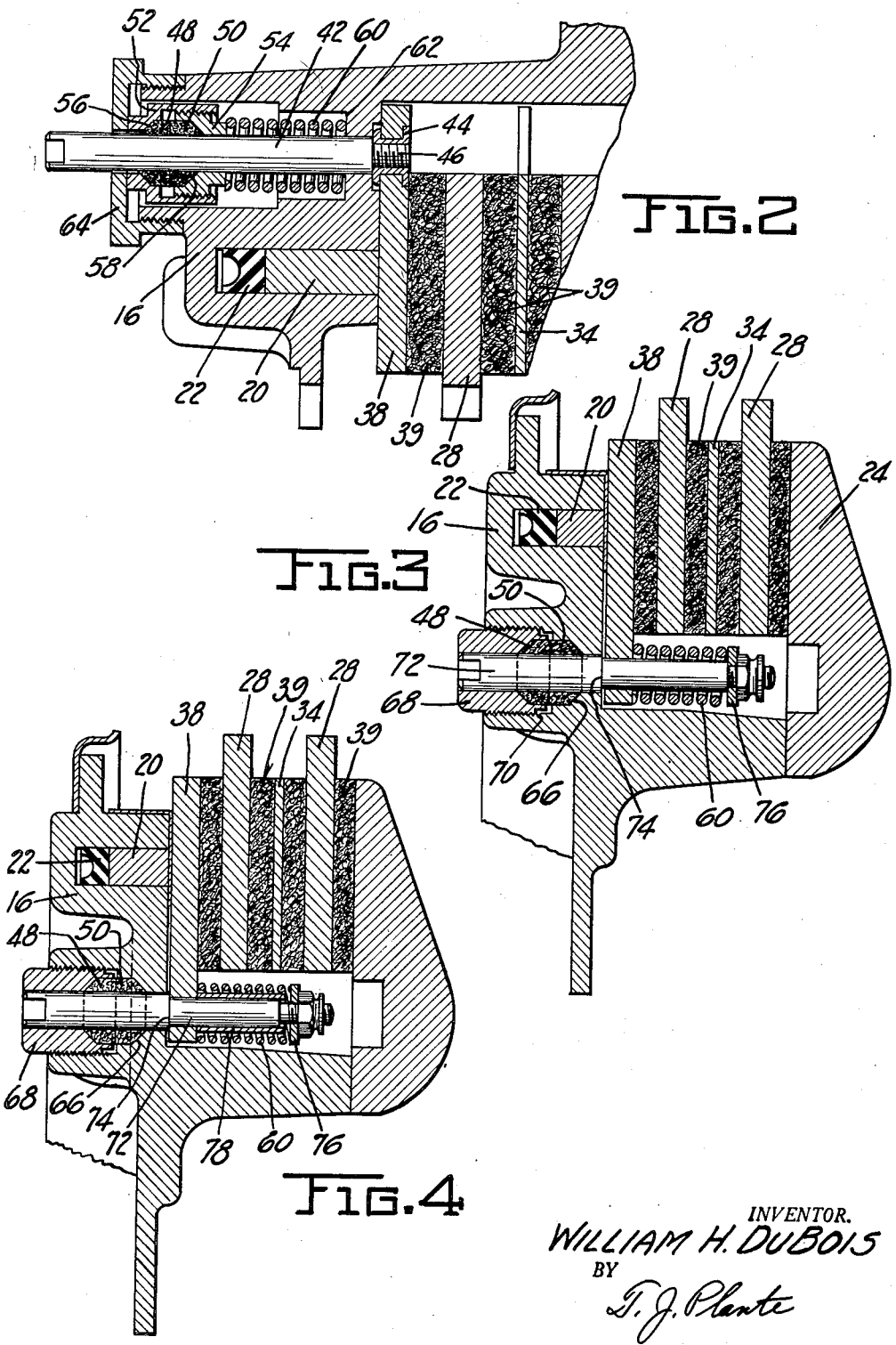

2,551,251

UNITED STATES PATENT OFFICE 2,551,251

AUTOMATICALLY ADJUSTING BRAKE

William H. Du Bois, South Bend, Ind., assignor to Bendix Aviation Corporation, South Bend, Ind., a corporation of Delaware Application February 8, 1946, Serial No. 646,247

8 Claims. (Cl. 188—72)

This application is the parent of divisional application Serial No. 71,891 filed January 21, 1949.

This invention relates to automatically adjusting brakes, and is primarily concerned with automatically operating adjusting means for disk brakes, although the principles of the invention may be applied to a wider range of brakes and also to other types of friction device. The general object of the invention is to provide a disk brake automatic adjustment improved over previous automatic adjustments both as to efficiency of operation and as to simplicity of structure.

In disk brakes the compressive force against the interleaved friction disks of the brake is usually applied through an end disk termed the "pressure plate." This plate has the maximum axial movement, and adjustment of the released position of this plate suffices as an adjustment for the brake as a whole. The position of a member which limits the retraction of the pressure plate may therefore serve to control the adjustment of the brake. By permitting movement of such a retraction-limiting member in only one direction, it is possible to provide an automatically adjusting brake. Additional provision is required to insure suitable brake clearance in released position.

One object of the present invention is to control the automatic adjustment by means of a simple frictional clamping device which determines the released position of the pressure plate. Such a frictional clamping device constitutes a positive but not immovable connection between the retraction-limiting member and a fixed part of the brake assembly. Although the frictional clamping device resists relative movement of the retraction-limiting device in both directions, its movements are uni-directional because the urge to move in one direction is provided by the relatively light return spring force, whereas the urge to move in the opposite direction is provided by the relatively heavy applying force developed in actuating the brake.

Heretofore it has been customary to locate the brake return springs between the pressure plate and the opposite side of the disk brake assembly. With such an arrangement, as the position of the pressure plate is progressively adjusted to compensate for brake wear, the initial compressive force of the return springs is increased. This means that a greater initial applying force must be exerted on a partially worn and adjusted brake than on a newly-lined and unadjusted brake. Therefore, although the adjustment conserves pedal travel, it raises the pressure required to force the disks into frictional contact.

It is an object of the present invention to provide a combined automatic adjustment and return spring assembly which will retain the length and force of the return spring substantially constant regardless of the extent of adjustment. In other words, the length of the return spring in released or retracted position, and therefore the force required to compress the spring, remain substantially the same regardless of the released position of the pressure plate. This constitutes an important development, because it greatly simplifies return spring design, particularly in cases involving extremely wide multiple-disk brakes.

Other objects and advantages of the present invention will become apparent during the course of the following description, reference being had therein to the accompanying drawings, in which:

Figure 1 is a vertical section taken through a disk brake assembly incorporating my invention;

Figure 2 is an enlarged sectional view providing a close-up of the automatic adjusting means of Figure 1;

Figure 3 is a partial vertical section showing a disk brake assembly incorporating a modified version of my improved automatic adjustment; and Figure 4 is a sectional view showing an automatic adjustment similar to that of Figure 3, but having a different means for controlling the brake clearance.

Referring to Figure 1, a brake carrier 12, which is secured to the non-rotating axle 14, constitutes a fixed member of the brake assembly. The illustrated brake is intended particularly for use on airplanes, and therefore the axle 14 is illustrated as a non-rotating member. If the brake were used in conjunction with a rotating axle, the carrier 12 would be secured to a non-rotating member or part of the vehicle. The carrier 12 has an outwardly extending thickened flange 16 within which is provided a chamber 18 having an annular reciprocable piston 20 and a suitable annular seal 22. Introduction of fluid into chamber 18 from a suitable source of pressure causes piston 20 to move toward the right to apply the brake.

A backing plate 24 is rigidly secured to brake carrier 12 by means of a plurality of circumferentially spaced axially extending bolts 26. Thus, the flange 16 of the brake carrier and backing plate 24 constitute the fixed end members of the brake assembly, and are neither rotatable nor axially movable.

In the illustrated disk brake arrangement, there are four rotor disks 28 which are driven by a plurality of circumferentially spaced axially extending keys 30 carried by the wheel 32. Assembled in interleaved arrangement with the rotor disks 28 are three stator disks 34, which are prevented from rotating movement because they engage the sleeves 36 carried by the anchor bolts 26, but which are capable of axial movement along the length of said anchor bolts. It will, of course, be appreciated that the principles of the present invention are applicable regardless of the number of rotor and stator disks used in the brake assembly. The invention has equal merit in a brake having one rotor and in a brake having several rotors. However, the brake shown in Figure 1 is an excellent example of the relatively small diameter, but wide, brake construction which is coming into extensive use, the large number of rotor and stator disks being required to obtain the necessary wheel-retarding friction.

Application of pressure to urge the rotating and non-rotating disks into frictional engagement is accomplished by movement of piston 20 under the pressure of fluid in chamber 18, the piston acting on the brake through a movable end plate 38 which is generally termed the "pressure plate."

Suitable friction linings 39 are provided for the brake members, the linings being illustrated as carried by the three stator disks 34, by pressure plate 38, and by backing plate 24. The linings are secured to the respective plates by suitable fastening means, such as the rivets 40 illustrated in the upper portion of Figure 1.

As the linings 39 wear, the brake clearance increases, i. e. the distance through which the piston 20 and pressure plate 38 must move before bringing the brake disks into engagement becomes greater, and this results in loss of effective pedal travel unless a suitable adjusting arrangement is provided for the brake assembly. Heretofore the adjustment has usually been accomplished manually, but it is one purpose of the present invention to provide an efficient and yet simple automatic mechanism for adjusting the position of pressure plate 38, and thereby maintaining a substantially constant clearance in the brake. Incidentally, it will be appreciated that adjustment of the released position of pressure plate 38 brings about a change in the released position of piston 20, and additional fluid is maintained in chamber 18, the required additional fluid being obtained from the usual reservoir associated with the pressure producing device of the fluid system.

Heretofore the conventional arrangement has included a plurality of return springs compressed between backing plate 24 and pressure plate 38. These return springs serve to move pressure plate 38 to released position upon release of pressure in chamber 18. Any adjustment of pressure plate 38 has, in prior constructions, caused a reduction in the released position length of the return springs and therefore has involved an increase in the initial compressive force of the springs. Thus, application after adjustment has always required a greater initial pressure to overcome the return springs than application before adjustment.

The present invention, in addition to providing automatically operable means for adjusting the brake, so associates the brake return springs with the adjusting means as to retain the same initial compressive force on the springs regardless of the amount of adjustment theretofore made, thereby enabling a given initial force to overcome the return springs throughout the adjustment range.

A plurality of circumferentially spaced axially extending pins or rods 42 are secured to the pressure plate 38, bushings 44 preferably being provided to receive the threaded ends 46 of the axially extending pins. Because the pins 42 are secured to the pressure plate 38, axial movement of the pressure plate is accompanied by axial movement of the pins, and furthermore, the released position of the pins determines the released position of the pressure plate. Associated with each axially extending pin 42 is an automatic adjustment mechanism which gradually changes the released position of pressure plate 38 as the brake linings wear. I prefer to provide a plurality of these automatic adjustment devices, spaced circumferentially around the brake assembly. I find it convenient to associate an automatic adjusting device with each return spring of the brake assembly, and, inasmuch as a sufficient number of return springs must be used to provide adequate retracting pressure on pressure plate 38, a number of automatic adjustors should be provided in each brake assembly. By way of example, a convenient number of springs and adjustors is twelve, spaced equally around the brake circumference.

Because each of the combined return-spring-and-automatic-adjustment devices is preferably identical with all the others, the following description of one of said devices will be considered as applicable to all of those required for a given brake assembly (attention is directed particularly to the enlarged view of one of such devices provided by Figure 2).

Means are provided for exerting frictional clamping force on each pin 42, thereby controlling the released position of pressure plate 38. The frictional clamping means may comprise a pair of axially split washers 48 and 50 which encircle the pin 42. The washers 48 and 50, which may be made of soft metal, are held in engagement with the pin 42 by means of interengaging threaded members 52 and 54. Member 52 has a frusto-conical surface 56 engaging a complementary frusto-conical surface on split washer 48, and member 54 has a frusto-conical surface 58 engaging a complementary frusto-conical surface on split washer 50. By turning down member 52 with respect to member 54, said members are drawn together axially, thereby exerting a force through the conical or tapered engaging surfaces to clamp the split washers 48 and 50 against the pin 42. The frictional force with which the washers grip the pin is controlled by the amount of relative axial movement of the members 52 and 54, and thus the amount of frictional gripping force may be adjusted by screwing the member 52 inwardly or outwardly with respect to the member 54.

A return spring 60 is compressed between the surface 62 of carrier flange 16 and member 54. Thus the force of the return spring acts through the frictional clamping means and through pin 42 to urge pressure plate 38 and piston 20 toward the left, or, in other words, toward released or retracted position. The leftward movement of pin 42 under the influence of spring 60 is limited by the cap 64 screwed onto the left end of carrier flange 16, cap 64 acting as a stop member which is engaged by member 52 to limit the return movement of pin 42.

The operation of the combined return spring and automatic adjustment is as follows. When fluid pressure is applied against piston 20 to move pressure plate 38 toward the right and bring the brake disks into engagement, pin 42 moves with pressure plate 38, and, because of the frictional connection between pin 42 and the elements 48, 50, 52 and 54, spring 60 is compressed as the pressure plate 38 and the pin 42 move on the pressure stroke. When the brake applying pressure against piston 20 is removed, the several return springs 60 return the pressure plate 38 and piston 20 to released position, as determined by contact of member 52 with cap 64. This removes the pressure tending to cause engagement of the brake disks and releases the brake. Although the several friction disks are not individually returned to released position, any slight drag or friction between the disks causes them to disengage and permits the wheel to turn freely. As mentioned above, the present brake is intended primarily for airplane use, and any slight drag or friction in the brake which might result from the absence of individual return springs for each brake disk is of no practical significance. While the plane is in the air, the wheel, of course, is not turning, and it is therefore only during a relatively small percentage of the operating time of the plane that any frictional drag would be in effect.

If, during application of the brake, the spring 60 is compressed until it becomes solid, i. e., until the coils of the spring engage one another, further applying movement of piston 20 and pressure plate 38 will cause pin 42 to move axially relative to the friction clamping members 48 and 50, the latter members being limited in their rightward movement by the solid spring 60. After such relative movement has occurred between the pin 42 and the frictional clamp device, release of the brake applying pressure and retraction of pressure plate 38 by the springs 60 will not bring said plate and piston 20 back to their original position, but will return them only until member 52 contacts stop member 64. Therefore, subsequent applications of the brake will not require an increased axial movement of piston 20, the running clearance being kept substantially constant by the automatic adjustment.

The running clearance for the brake may be provided by several methods. One of these methods is that shown in Figure 1, wherein the difference between the spring height at normal brake released position and its solid height equals the brake clearance required. Figure 4 illustrates a brake in which a sleeve is provided between the pin and the spring, the sleeve being of such length that it equals the spring height at brake released position minus the running clearance required. Further description of Figure 4 will be made after Figure 3 has been discussed, Figure 4 showing a variation on the fundamental structure of Figure 3.

In the device of Figure 1, the running clearance of the brake is adjustable, due to the threaded connection between stop member or nut 64 and the carrier flange 16. By turning the nut 64 to move it toward the right, the running clearance of the brake is diminished, whereas, by turning the nut 64 to move it toward the left, the running clearance of the brake is increased.

The frictional force between gripping members 48 and 50 and pin 42 must be sufficient to overcome the return spring effort at all times. An excessively strong grip on pin 42 is, however, undesirable because a greater applying pressure is then necessary to overcome this frictional force, and the brake efficiency is thereby decreased. The ideal situation occurs when the grip of the friction device is just slightly greater than the return spring force.

Essentially, it is seen, a simple frictional clamping device is provided to accomplish the function of automatically adjusting the brake, the friction of said device being great enough to overcome the lighter force of the return spring, but insufficient to withstand the greater force of the brake applying pressure.

Because member 52 always returns to stop member 64 in released position, the initial length of spring 60 remains the same throughout the brake adjustment range. Pin 42 moves inwardly with respect to the friction clamping device and with respect to spring 60, but the position and length of spring 60 remain the same. This means that the initial force required to overcome spring 60 will always be substantially the same, and that gradual adjustment of the brake to compensate for lining wear will not cause a build-up of the spring pressure. The importance and value of such an arrangement is obvious from a study of the structure illustrated in Figure 1, inasmuch as the total adjustment which must be made is so great as to have a very considerable effect on the spring force, if it is necessary to gradually compress the spring as the brake is adjusted. With an arrangement of the type in which adjustment causes a gradual shortening of the spring, use of return springs having relatively high rates of pressure increases causes an excessive differential to be set up between the initial force required in applying a newly-lined brake and the initial force required in applying a partially or fully adjusted brake. With my improved arrangement, the return springs have a working distance only slightly greater than the required running clearance, for example, approximately $\frac{3}{32}$ to $\frac{1}{16}$ inch, whereas with prior constructions the springs had to be designed to function through a distance equal to the total lining wear of perhaps ½ inch or more.

Figure 3 shows a modified version of the disk brake automatic adjustment. In this case, the axially split rings 48 and 50 are retained between a conical surface 66, which is formed in the flange 16 of the brake carrier, and an adjustable nut 68 which is screwed into the threaded opening 70 formed in the flange 16. The frictional gripping pressure between the members 48 and 50 and the axially extending pin 72 is controlled by the nut 68 and can be increased or decreased by turning the nut farther into the threaded opening or turning it partially out of the opening. The pin 72, which corresponds functionally to the pin 42 of Figures 1 and 2, is provided with a shoulder 74 which determines the released position of pressure plate 38. The return spring 60 is located inside the brake assembly, and is compressed between the pressure plate 38 and a collar 76 carried by pin 72.

As in the case of the device shown in Figures 1 and 2, pressure exerted against piston 20 moves pressure plate 38 toward the right to apply the brake. Movement of the pressure plate compresses spring 60. When the brake is released, spring 60 urges pressure plate 38 against the shoulder 74 of pin 72 and thus provides the desired running clearance. If, due to wear of the brake linings 39, the pressure plate 38 continues to move toward the right after spring 60 has been fully compressed, or, in other words, brought into solid position, the pressure exerted through piston 20 will overcome the frictional resistance between members 48 and 50 and pin 72, and the pin will move axially to take up the excess brake clearance. Afterwards, when the brake pressure is released, the return spring 60 will return pressure plate 38 to released position, in which it contacts the shoulder 74.

It will be obvious from the foregoing that the operational features and advantages of the structure of Figure 3 are substantially the same as those of the structure of Figure 1. In Figure 3, the maximum extension of spring 60 is always determined by the distance between collar 76 and shoulder 74, a distance which does not change. The nut 68, which determines the amount of frictional grip in the structure of Figure 3, should be turned down to cause a frictional force greater than the maximum force of the spring, but not excessively high.

Figure 4 illustrates a structure substantially identical with that of Figure 3, except that the maximum travel of pressure plate 38, permitted before the pin 72 is moved axially, is determined, not by the solid height of the spring as in Figures 1, 2 and 3, but by the length of the sleeve 78 located between pin 72 and spring 60. After pressure plate 38 has moved far enough toward the right to bring sleeve 78 into engagement both with the pressure plate and with collar 76, further movement of the pressure plate toward the right moves the pin 72 and thus adjusts the brake.

It will be obvious from the several figures of the drawings that the sleeve expedient of Figure 4 (use of sleeve 78 to control running clearance) can be as well applied to the general arrangement of Figures 1 and 2 as to the general arrangement of Figure 3.

Although certain particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. An automatically adjusting disk brake comprising two axially fixed and non-rotating members constituting the end members of the brake assembly, one or more axially movable rotor disks located between said fixed members, one or more axially movable stator disks also located between said fixed members and in interleaved arrangement with the rotor disks, one of said stator disks comprising a pressure plate through which brake applying pressure is exerted to compress the brake disks, said pressure plate being the disk closest one of said fixed end members, the fixed end member adjacent the pressure plate having a threaded opening therein provided with a frusto-conical inner surface, an axially extending pin projecting through the opening in said end member and through the pressure plate, said pin having a shoulder which determines the released position of the pressure plate, a collar on the inner end of the pin, a return spring compressed between the collar and the pressure plate to urge the latter toward released position against the shoulder on the pin, a split washer encircling the pin and having a frusto-conical surface engaging the frusto-conical inner surface of the opening in the aforementioned fixed end member, a second split washer also encircling the pin, said second split washer engaging the first washer and having an outer frusto-conical surface, and a nut screwed into the threaded opening in the fixed end member and having a frusto-conical surface engaging the outer surface of the second split washer to cause the washers to frictionally grip the pin as the nut is turned down, the friction between the washers and the pin being greater than the force required to compress the return spring.

2. In a disk brake comprising a fixed member and an axially movable pressure plate, a combined return spring and automatic adjustor comprising an axially extending pin projecting through the fixed member and through the pressure plate, said pin having a shoulder which determines the released position of the pressure plate, a collar on the inner end of the pin, a return spring compressed between the collar and the pressure plate to urge the latter toward released position against the shoulder on the pin, a split washer encircling the pin and located in an opening in said fixed member, and a nut screwed into the opening in said fixed member and arranged to frictionally clamp the washer to the pin with a force greater than required to compress the return spring.

3. An automatically adjusting disk brake comprising two axially fixed and non-rotating members constituting the end members of the brake assembly, one or more axially movable rotor disks located between said fixed members, one or more axially movable stator disks also located between said fixed members and in interleaved arrangement with the rotor disks, one of said stator disks comprising a pressure plate through which brake applying pressure is exerted to compress the brake disks, said pressure plate being the disk nearest one of said fixed end members, an axially extending pin projecting through the pressure plate and through an opening in the fixed end member adjacent the pressure plate, said pin having a shoulder on one side of said pressure plate which determines the released position of the pressure plate, a collar carried by the inner end of the pin on the opposite side of said pressure plate from said shoulder, a return spring compressed between the collar and the pressure plate to urge the latter toward released position against the shoulder on the pin, and a friction connection between said pin and the fixed end member whereby relative movement therebetween occurs in one direction only since sufficient force to overcome the friction is developed only during brake application.

4. In a disk brake comprising a fixed member and an axially movable pressure plate, a combined return spring and automatic adjustor comprising an axially extending pin projecting through the fixed member and through the pressure plate, said pin having a shoulder on one side of said pressure plate which determines the released position of the pressure plate, a collar carried by the inner end of the pin on the opposite side of said pressure plate from said shoulder, a return spring compressed between the collar and the pressure plate to urge the latter toward released position against the shoulder on the pin, and a friction connection between said pin and the fixed member whereby relative movement therebetween occurs in one direction only since sufficient force to overcome the friction is developed only during brake application.

5. For use in a disk brake having an axially fixed member and an axially movable member which moves a distance partially determined by the amount of brake wear, automatically operating means for limiting the return movement of the movable member comprising an axially extending pin projecting through both the movable member and the fixed member, a member which frictionally surrounds said pin and engages said fixed member to restrict movement of said pin with respect to said fixed member, a shoulder on said pin on one side of said movable member which limits the return movement of said movable member, and means on the opposite side of said movable member from said shoulder and carried by said pin yieldably urging said movable member toward released position.

6. For use in a disk brake having an axially fixed member and an axially movable member which moves a distance partially determined by the amount of brake wear, automatically operating means for limiting the return movement of the movable member comprising an axially extending pin reciprocably received through both the movable member and the fixed member, a member which frictionally surrounds said pin and engages said fixed member to restrict movement of said pin with the respect to said fixed member, a shoulder on said pin on one side of said movable member which limits the return movement of said movable member, and means on the opposite side of said movable member from said shoulder and carried by said pin yieldably urging said movable member toward released position.

7. For use in a disk brake having an axially fixed member and an axially movable member which moves a distance partially determined by the amount of brake wear, automatically operating means for limiting the return movement of the movable member comprising an axially extending pin projecting through both the movable member and the fixed member, a frictional clamping member carried by the pin and abutting against the fixed member to prevent movement of said pin until the frictional clamping force is overcome, said clamping member being split at one side to engage the opposite sides of the pin, a collar on the inner end of the pin, a return spring compressed between the collar and the movable member to urge said member toward released position, and a shoulder on the pin between its ends which limits the return movement of the movable member.

8. For use in a disk brake having an axially fixed member and an axially movable member which moves a distance partially determined by the amount of brake wear, automatically operating means for limiting the return movement of the movable member comprising an axially extending pin projecting through both the movable member and the fixed member, said pin having a stepped diameter which provides an annular shoulder between the pin ends, a frictional clamping member carried by the pin and abutting against the fixed member to prevent movement of said pin until the frictional clamping force is overcome, said clamping member being split at one side to engage the opposite sides of the pin, a collar on the inner end of the pin, and a return spring compressed between the collar and the movable member to urge said member toward released position, said shoulder engaging one side of said movable member to limit the return movement thereof.

WILLIAM H. DU BOIS.

REFERENCES CITED

The following references are of record in the file of this patent:

UNITED STATES PATENTS

| Number | Name | Date |
| --- | --- | --- |
| 2,349,132 | Baird | May 16, 1944 |
| 2,392,970 | Bricker | Jan. 15, 1946 |